(12) United States Patent  
Ann et al.

(10) Patent No.: US 7,970,537 B2  
(45) Date of Patent: Jun. 28, 2011

(54) SYSTEM AND METHOD FOR NAVIGATION USING VISIBLE LIGHT COMMUNICATIONS

(75) Inventors: Jong-Hoon Ann, Suwon-si (KR); Jae-Seung Son, Suwon-si (KR); Eun-Tae Won, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 613 days.

(21) Appl. No.: 12/013,145

(22) Filed: Jan. 11, 2008

(65) Prior Publication Data

US 2008/0281515 A1 Nov. 13, 2008

(30) Foreign Application Priority Data

May 11, 2007 (KR) .................. 10-2007-0046218

(51) Int. Cl.  
*G01C 21/30* (2006.01)
(52) U.S. Cl. ............. 701/210; 701/32; 701/36; 398/172
(58) Field of Classification Search .................... 701/32, 701/33, 36, 200, 208, 209, 210; 398/130, 398/135, 172, 138  
See application file for complete search history.

(56) References Cited

U.S. PATENT DOCUMENTS

| 7,583,901 B2 * | 9/2009 | Nakagawa et al. ........... 398/183 |
| 2009/0171571 A1 * | 7/2009 | Son et al. ...................... 701/208 |

FOREIGN PATENT DOCUMENTS

| JP | 10-281796 A1 | 10/1998 |
| JP | 2003-114136 A | 4/2003 |
| JP | 2006-138845 A | 6/2006 |
| JP | 2007-33125 A | 2/2007 |
| JP | 2008-203025 A | 9/2008 |
| JP | 2008-224536 A | 9/2008 |

* cited by examiner

*Primary Examiner* — Gertrude Arthur Jeanglaud  
(74) *Attorney, Agent, or Firm* — Jefferson IP Law, LLP (57) ABSTRACT

A navigation system and a navigation method inside of a building using Visible Light Communications (VLC) are provided. The navigation system includes a map server, in which map information required to provide a navigation function is stored, for transferring the map information to each lamp, a plurality of lamps, installed in each zone inside of the building and having their respective identifiable and unique IDentifications (IDs), for receiving the map information required to provide the navigation function from the map server, and for generating a visible light signal in response to the received map information by using a VLC module, and a mobile terminal, equipped with a visible light Rx module, for being provided with the map information upon receiving the visible light signal generated from the lamp, and for displaying a map image in response to the provided map information.

26 Claims, 10 Drawing Sheets

SYSTEM AND METHOD FOR NAVIGATION USING VISIBLE LIGHT COMMUNICATIONS

PRIORITY

This application claims the benefit under 35 U.S.C. §119(a) of a Korean patent application filed on May 11, 2007 in the Korean Industrial Property Office and assigned Serial No. 2007-46218, the entire disclosure of which is hereby incorporated by reference.

BACKGROUND OF THE INVENTION

1. Field of the Invention

The present invention relates to a navigation system. More particularly, the present invention relates to a system and a method for providing a navigation service inside of a building by using visible light communications.

2. Description of the Related Art

Recently, the luminous efficiency of Light Emitting Diodes (LEDs) has been improved while the unit price of LEDs has dropped. Accordingly, LEDs are more commonly used not only in the special illumination market, such as for handheld devices, displays, automobiles, traffic lights, advertising boards and the like, but also in the general illumination market, such as fluorescent lamps, incandescent electric lamps and the like. Also, interest in optical wireless technology that is complementary with Radio Frequency (RF) technology has currently been increased because of the limitations of RF technologies. That is, with an exhaustion of frequencies in the RF band, a possibility of an error among wireless communications, an increase of the security requirements for wireless communications, the advent of the very high speed ubiquitous communication environment of fourth generation mobile communication (4G) wireless technology, etc., studies are being performed on visible light wireless communications using visible light LEDs by many enterprises, research institutes, etc.

The visible light communication technologies that deliver information by using visible light are safe, and have a widely available band. Also, they can be used without being subject to regulation, and have advantages in that the reception range of information communicated using the visible light technologies can be accurately detected. That is, an area where the visible light reaches or a direction in which the visible light moves can be easily seen without the need for complicated and expensive equipment. Accordingly, the visible light communication technologies have reliability which makes them more secure, and also have advantages such as the ability to be driven with low electric power thus reducing their power consumption in comparison with other technologies. Accordingly, the visible light communications can be applied in such diverse locations as a hospital, an airplane, etc., where the use of RF is limited and a value-added information service can also be provided by using an electric light board. A description will now be made of these visible light communications with reference to the drawings.

Figure 1A:
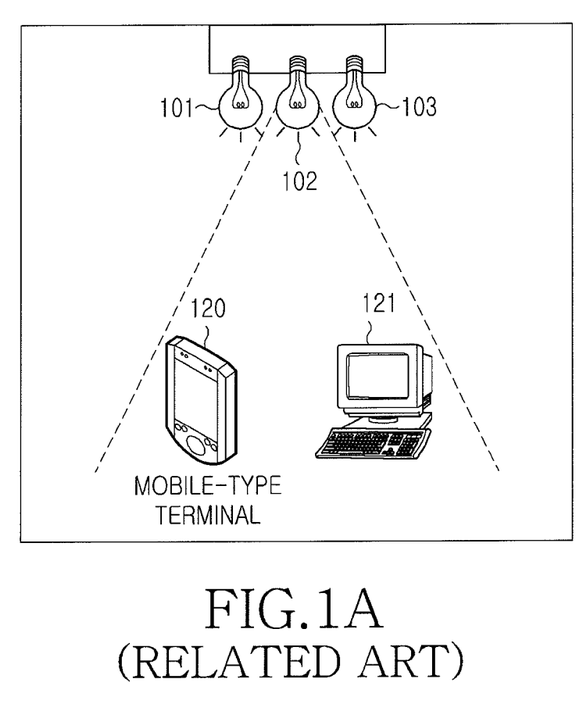
FIGS. 1A and 1B are views illustrating communication systems using conventional Visible Light Communications (VLC)
Figure 1B:
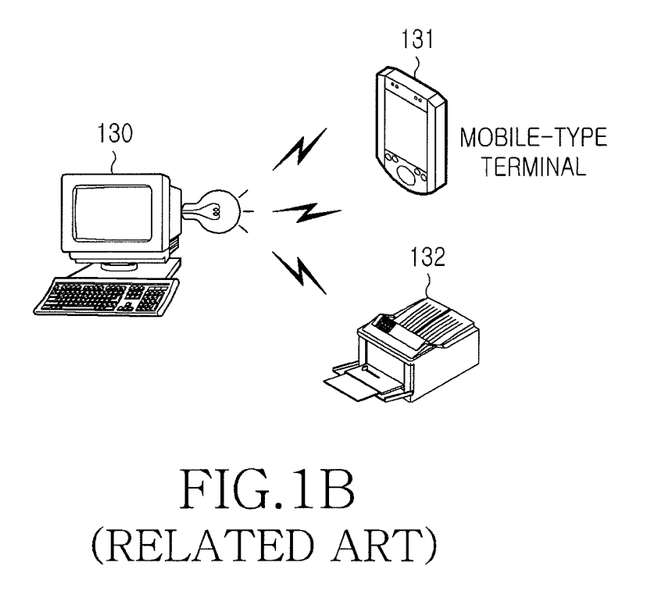

FIGS. 1A and 1B are views illustrating configurations of communication systems using conventional Visible Light Communications (VLC). FIG. 1A is a view illustrating a conventional VLC system. The conventional VLC system is configured to include lamps 101, 102 and 103, which comprise Light Emitting Diodes (LEDs) or Laser Diodes (LDs). Lamps 101, 102 and 103 perform data transmission/reception (Tx/Rx) by using visible light while simultaneously performing the role of ambient lighting. Communication devices 120 and 121, each of which is equipped with a visible light Tx/Rx module, are able to perform data Tx/Rx with the lamps. As illustrated in FIG. 1A, the communication devices may include a mobile terminal 120 such as a mobile phone, a Personal Digital Assistant (PDA) and the like, and a fixed type terminal 121 such as a desktop and the like.

FIG. 1B is a view illustrating a peripheral interface system using VLC. Communications among peripheral devices using VLC includes a communication system which performs, by using visible light, communications among a communication device 130 such as a notebook computer, a desktop computer, etc., each of which is equipped with a visible light Tx/Rx module, a mobile device 131 (e.g., a mobile phone, a PDA, etc.), a peripheral device 132 (e.g., a printer, etc.), and a small-sized digital device (e.g., a digital camera, an mp3 player, etc.). The peripheral interface using VLC has advantages in that it is secure and can be implemented so as to be driven with low electric power.

In addition, the VLC can be utilized efficiently in connection with a communication system using a different communication media, such as a wire or wireless communication media. As an example, a detailed description will be made below of a VLC system that provides information by using lighting inside of a building in connection with power line-based Power Line Communications (PLC).

Figure 2A:
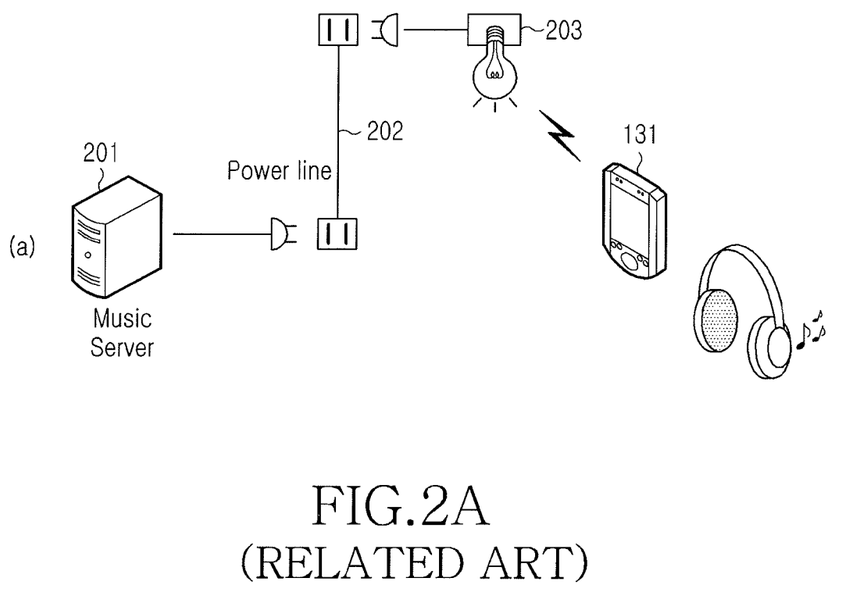
FIGS. 2A and 2B are views illustrating communication systems using conventional PLC and VLC.
Figure 2B:
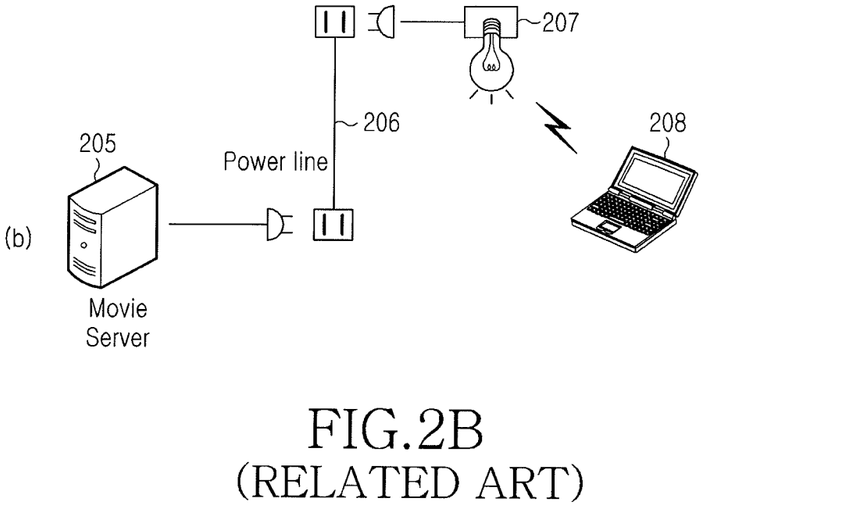

FIGS. 2A and 2B are views illustrating conventional configurations of communication systems using conventional PLC and VLC. FIG. 2A illustrates a system that broadcasts music information using a communication system employing PLC and VLC. With reference to FIG. 2A, a communication system includes a music server 201 in which data to be provided to users is stored, a power line 202 for performing PLC between the music server 201 and a lamp 203, the lamp 203 which performs PLC to receive data from the music server 201 and then transmits the received data as a visible light signal, and a mobile terminal 131 for receiving the visible light signal transmitted from the lamp 203. In the communication system employing PLC and VLC with as illustrated in FIG. 2A, data is transferred from the music server 201 to the lamp 203 through the PLC based on the power line 202. The lamp 203 modulates the received data into a visible light signal, and then broadcasts the visible light signal by using an LED. On receiving the visible light signal transmitted from the lamp 203, the mobile terminal 131 converts the received visible light signal into an electrical signal. The mobile terminal 131 can then use the electrical signal to perform a function, such as playing a music file. FIG. 2B illustrates a system for broadcasting image information to users by using a communication system including PLC and VLC. The system depicted in FIG. 2B has substantially the same configuration and performs substantially the same operation as the configuration and operation of the system illustrated in FIG. 2A. More specifically, the communication system of FIG. 2B includes a movie server 205, a power line 206 and a lamp 207. The movie server 205 provides information to lamp 207 through power line 206. The lamp 207 receives and modulates the information so that it can be broadcast using visible light to a terminal 208. The terminal 208 can then use the information to view a movie and the like. Accordingly, in the VLC system, information originating from the movie server 205 can be provided to a terminal by using VLC wherever lighting is illuminated.

A mobile communication terminal, such as a mobile phone, a Personal Communications Services (PCS), an International Mobile Telecommunication-2000 (IMT-2000), a PDA and the like which a user can carry with him/her, provides a simple voice call function for a user. Recently, various types of convenience functions, such as a message Tx/Rx function, a wireless internet function, a schedule management function, a navigation function, etc., besides a simple voice call function, have been added to the mobile communication terminal.

One of these convenience functions is a navigation function which uses a Global Positioning System (GPS). Using this function, a user is provided with path information which leads from the user's current location to an input destination. The user is thereby provided with an optimal path and a movement direction by which to arrive at the input destination. Generally, such a navigation system can determine the optimal path through map data stored in a database.

This type of navigation system has been primarily developed for use in navigating a car. However, further developments are being made for a navigation device in the form of a mobile communication terminal, such as a mobile phone, etc., for use by a pedestrian who pays a visit to a destination in a crowded downtown or in an unfamiliar place. The navigation device for a pedestrian enables the pedestrian who carries the navigation device with him/her to be supplied with an optimal path and to monitor the navigation device for a movement direction.

However, in the case of the navigation system employing the prior GPS, a problem is raised in that, if a pedestrian enters the inside of a building or travels underground, he/she cannot receive a GPS signal, and can then not use the navigation service.

Accordingly, in response to the increasing trend of large buildings, such as skyscrapers, large shopping malls, large underground shopping centers, etc., in which a GPS navigation signal is not present, there is an increasing need for navigation inside of a building.

SUMMARY OF THE INVENTION

An aspect of the present invention is to address the above-mentioned problems and/or disadvantages and to provide at least the advantages described below. Accordingly an aspect of the present invention is to provide a system and a method for providing a navigation service inside of a building by using Visible Light Communications (VLC).

In accordance with an aspect of the present invention, a navigation system inside of a building using Visible Light Communications (VLC) is provided. The system includes a map server in which map information required to provide a navigation function is stored, for transferring the map information to each lamp, a plurality of lamps which are installed in each zone inside of the building and having their respective identifiable and unique IDentifications (IDs), for receiving the map information required to provide the navigation function from the map server, and for generating a visible light signal in response to the received map information by using a VLC module, and a mobile terminal, equipped with a visible light Rx module, for being provided with the map information upon receiving the visible light signal generated from the lamp, and for displaying a map image in response to the provided map information.

In accordance with another aspect of the present invention, a navigation method inside of a building using Visible Light Communications (VLC) is provided. The method includes transmitting map information required to provide a navigation function from a map server to each lamp, generating, by each lamp, a visible light signal in response to the map information required to provide the navigation function by using a VLC module, receiving, by a mobile terminal, the visible light signal from a lamp illuminating a particular zone, wherein the mobile terminal is located in the particular zone, and computing a current location of the mobile terminal by using the received visible signal, and displaying a map image including the computed current location information, by the mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In addition, the following terms correspond to terminology defined in consideration of the functions in the present invention. The terms can be different depending on users' intentions, operators' purposes, precedents, and others. Hence, a definition of each term should be given based on the contents throughout the present specification.

In the present invention, a navigation function will be provided inside of a large building, such as a skyscraper, an extra large shopping center, etc., by using VLC, in which visible light corresponds to a medium. A navigation system employing a conventional GPS has a problem in that the navigation function can not be utilized in a zone, such as the inside of a building, where a GPS signal may not be received. In an exemplary embodiment of the present invention, so as to solve the above problem, a navigation system is configured by using visible light, instead of using the GPS. The visible light generated from lighting installed inside of a building has a limit on a reachable distance. Namely, if certain lighting is installed in a particular location inside of a building, light radiating from the lighting illuminates only a prescribed zone in which the light can reach. Accordingly, if the layout of the inside of the building and a location of each lighting device installed inside of the building are known, and lighting devices, each assigned a respective IDentification (ID), perform VLC with mobile terminals, a current location of a relevant mobile terminal can be detected by checking the ID of the lighting from which the relevant mobile terminal currently receives light. Hereinafter, a detailed description will be made of technology proposed in the present invention through the following exemplary embodiments.

Figure 3:
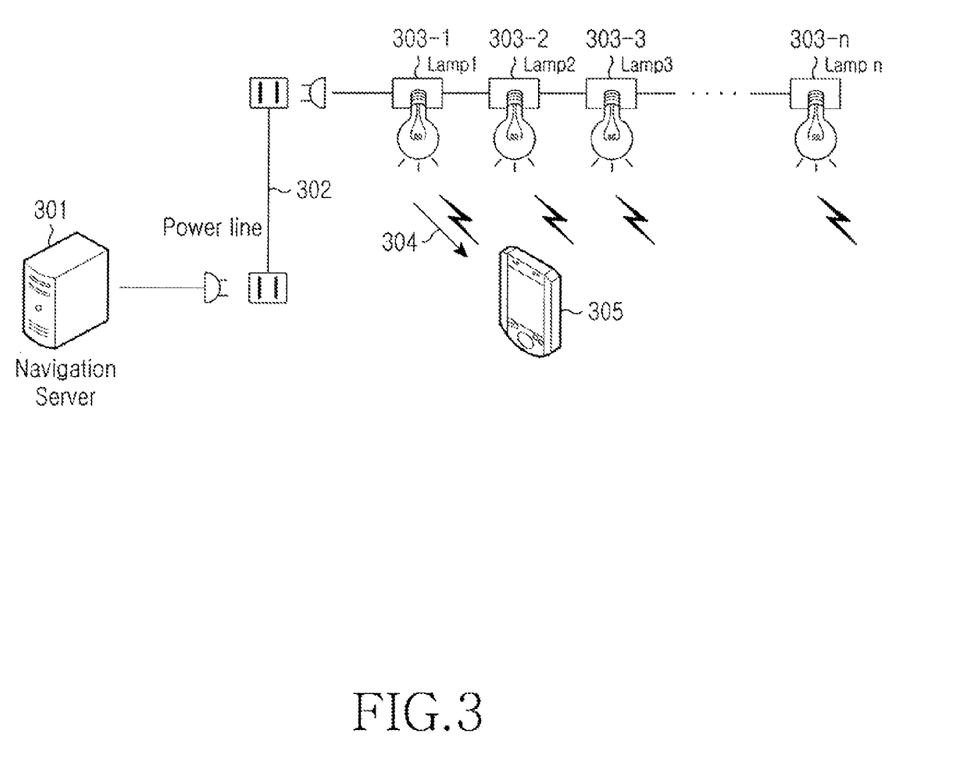
FIG. 3 is a view illustrating a configuration of a navigation system according to an exemplary embodiment of the present invention.

FIG. 3 is a view illustrating a configuration of a navigation system according to an exemplary embodiment of the present invention. As illustrated in FIG. 3, the navigation system according to an exemplary embodiment of the present invention includes a map server 301, a power line 302, a group of lamps 303-1 through 303-n and a mobile terminal 305.

In the map server 301, data required to provide the navigation function is stored. As the mobile terminal 305 has a limit on internal storage capacity, internal information about all buildings cannot be stored in the mobile terminal 305. Thus, information on map data inside of a building including, for example, a plan view of each floor of the building, locations of the respective lamps 303-1 through 303-n, and IDs of the respective lamps 303-1 through 303-n, is stored in the map server 301. The map server 301 performs communications with the respective lamps 303-1 through 303-n by using PLC.

The power line 302 is used as a medium for performing the PLC between the map server 301 and the group of lamps 303-1 through 303-n, and delivers data stored in the map server 301 to the group of lamps 303-1 through 303-n. While the PLC is used in an exemplary embodiment of the present invention, other usable wire/wireless communication methods, which do not depart from the spirit of the present invention, can be applied as well.

All zones of the relevant building are equipped with the lamps 303-1 through 303-n. The lamps 303-1 through 303-n provide not only ambient or background lighting, but also transmit visible light signals 304 as VLC devices. While data is transmitted through a downlink from the group of lamps 303-1 through 303-n to the mobile terminal 305 in an exemplary embodiment of the present invention, an uplink from the mobile terminal 305 to the group of lamps 303-1 through 303-n does not exist. Hence, since the map server 301 cannot detect a certain user's final destination, all pieces of information on the inside of the building necessary for a navigation operation are provided to the mobile terminal 305. Accordingly, the visible light signals 304 transmitted from the group of lamps 303-1 through 303-n include map information about the inside of the building including a plan view inside of the building, IDs of the respective lamps installed inside of the building, and location information on the lamps installed inside of the building. Each lamp ID corresponds to a value regarding the inside of the building and is used to determine a current location of the mobile terminal 305 as well as a user's final destination.

The mobile terminal 305, corresponding to a portable mobile communication device equipped with a visible light Rx module, receives a visible light signal 304 from the group of lamps 303-1 through 303-n, and then performs VLC. The mobile terminal 305 receives a relevant visible light signal 304, and then computes an optimal path from a current location of the mobile terminal 305 to a destination on the basis of map information. Also, the mobile terminal 305 determines an ID of a relevant lamp of the lamps 303-1 through 303-n from the received visible light signal to detect a current location thereof. The mobile terminal 305 continues to compare the current location thereof with path information computed by the mobile terminal 305, and determines if a current progress direction of the mobile terminal 305 is correct.

Figure 4:
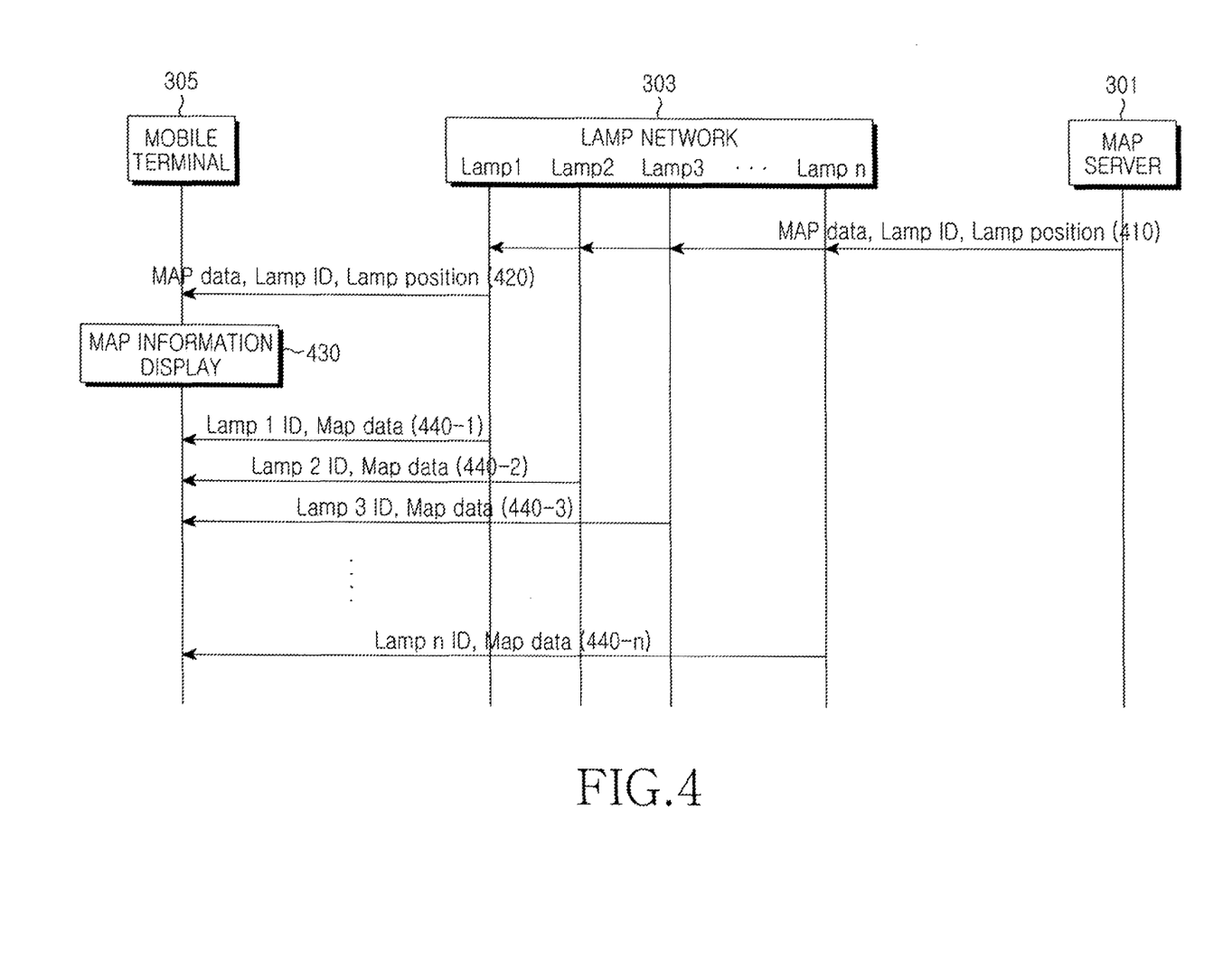
FIG. 4 is a flowchart illustrating a transmit/receive (Tx/Rx) operation of a navigation system according to an exemplary embodiment of the present invention.

FIG. 4 is a flowchart illustrating a transmit/receive (Tx/Rx) operation of a navigation system according to an exemplary embodiment of the present invention. Referring to FIG. 4, the navigation system according to an exemplary embodiment of the present invention includes a mobile terminal 305 for performing a navigation operation, a lamp network 303 constructed by lamps located inside of a building, and a map server 301 in which data required to perform the navigation function is stored.

In the navigation system according to an exemplary embodiment of the present invention, an uplink from the mobile terminal 305 to the lamp network 303 does not exist.

In step 410, the map server 301 transmits, to respective lamps of the lamp network 303, initial data including map information about the inside of the building including a plan view of each floor necessary for navigation, lamp location information inside of the building, and lamp ID information corresponding to a location of each lamp.

In step 420, each of the lamps 303-1 through 303-n generates a visible light signal in response to the received information by using a VLC module provided to each of the lamps, and the mobile terminal 305 receives the visible light signal from the relevant lamp of the lamps 303-1 through 303-n which is illuminating a zone where the mobile terminal 305 itself is located.

In step 430, the mobile terminal 305 displays map information about a floor where the mobile terminal 305 is currently located, and current location information of the mobile terminal 305 by using map information, lamp ID information, and lamp location information received from the relevant lamp of the lamps 303-1 through 303-n. If destination information is input by a user in step 430, the mobile terminal 305 computes optimal path information up to the destination, and then displays a path image. The path image may include map information about a floor where the mobile terminal 305 is currently located, current location information of the mobile terminal 305, and the computed optimal path information. Since an uplink up to the lamp network 303 does not exist with respect to the mobile terminal 305, a path search algorithm required for navigation must be stored in the mobile terminal 305.

In steps 440-1 through 440-n, if the user begins to move with reference to a display of the mobile terminal 305, the mobile terminal 305 compares a current location of the mobile terminal 305 with the computed optimal path information, and then determines if the user proceeds in a correct direction. Namely, the mobile terminal 305 detects ID information of a relevant lamp of the lamps 303-1 through 303-n from the visible light signal received from the relevant lamp illuminating a zone where the mobile terminal 305 is currently located, and then detects a current location of the mobile terminal 305. Successively, the mobile terminal 305 compares the current location with the computed optimal path information, and then determines if the mobile terminal 305 departs from the computed optimal path. If it is determined that the mobile terminal 305 departs from the computed optimal path, the user is notified of information on a direction by which the mobile terminal 305 may return to the optimal path, or a path is reset, depending on the extent to which the mobile terminal 305 departs from the optimal path.

Figure 5:
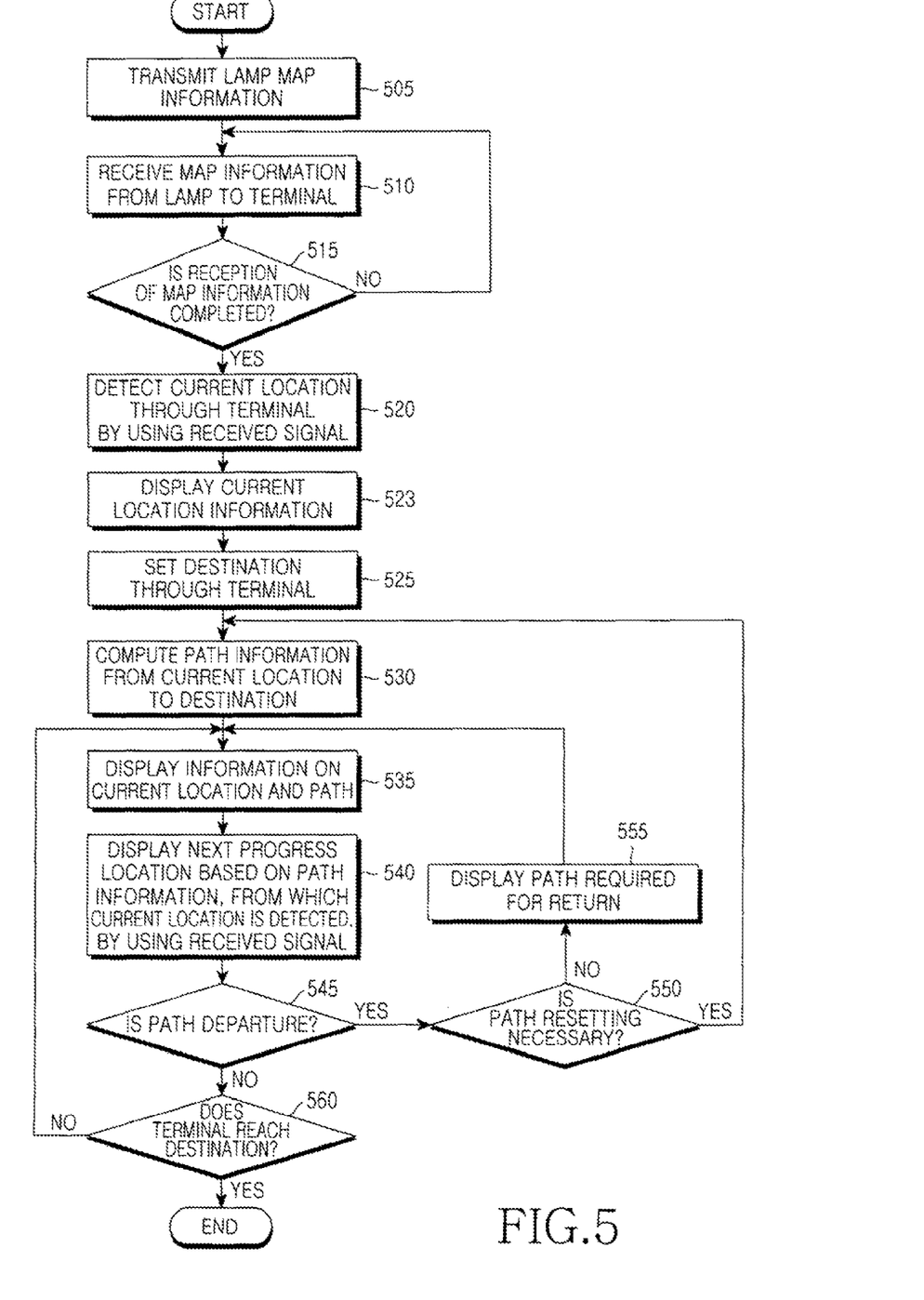
FIG. 5 is a flowchart illustrating an operation of a terminal in a navigation system according to an exemplary embodiment of the present invention.

FIG. 5 is a flowchart illustrating an operation of a terminal in a navigation system according to an exemplary embodiment of the present invention. With reference to FIG. 5, in step 505 a lamp transmits, as a visible light signal, map information about the inside of the building, IDs of the respective lamps, and location information of the respective lamps, which have been received from the map server and are required to perform the navigation function.

In step 510, the mobile terminal receives a visible light signal from a lamp illuminating a zone where the mobile terminal is located. In step 515, it is determined whether the receiving of the map information about the inside of the building, the IDs of the respective lamps, and the location information of the respective lamps is completed. If it is determined in step 515 that the receiving of the map information about the inside of the building, the IDs of the respective lamps, and the location information of the respective lamps is not completed, the procedure returns back to step 510, and then the mobile terminal continues to receive the map information about the inside of the building, the IDs of the respective lamps, and the location information of the respective lamps. In contrast, if it is determined in step 515 that the receiving of the map information about the inside of the building, the IDs of the respective lamps, and the location information of the respective lamps is completed, the procedure proceeds to step 520, and then a current location of the mobile terminal is detected by using the ID information of the lamps and the location information of the lamps from the received visible signal.

In step 523, by using the detected current location of the mobile terminal, the mobile terminal displays map information about a floor where the mobile terminal is currently located, and current location information of the mobile terminal.

In step 525, a destination is set through the mobile terminal. The destination setting can be performed through a user's input. In step 530, an optimal path from the detected current location to the set destination is computed by the mobile terminal.

Then, in step 535, the current location of the mobile terminal and the optimal path information are displayed by the mobile terminal. The display includes map information about a floor where the mobile terminal is currently located, a current location of the mobile terminal, and path information from the current location to the destination.

In step 540, the mobile terminal detects a current location of the mobile terminal through information on an ID and a location of the relevant lamp from the received visible light signal, and then displays a next progress location on the basis of the path information computed in step 530. In step 545, a determination of a path departure of the mobile terminal is made. The determination is made by comparing the current location of the mobile terminal detected in step 540 with the optimal path computed in step 530, and if the current location in not part of the optimal path, a determination of a path departure is made by the mobile terminal. If the determination of a path departure is correct in step 545, the procedure proceeds to step 550, and then determines if path resetting is necessary. Based on the path resetting determination, if the mobile terminal departs from the original optimal path by a short distance, a path is not reset, but a display is made so that the mobile terminal may return to the original path. In contrast, if the mobile terminal departs from the original optimal path by a long distance, an optimal path is computed again, and then a determination is made so that a path can be reset. The reference of the path resetting determination is established based on a distance difference between the original optimal path and a departed current location, and can be established in either a street unit, a block unit, or a floor unit, or other metric depending on the size or the structure of a relevant building. If it is determined in step 550 that path resetting is not necessary, the procedure proceeds to step 555, in which a path along which the mobile terminal returns to the original path is displayed, and then returns to step 535. If it is determined in step 550 that path resetting is necessary, the procedure returns to step 530, and then an optimal path from a new current location to the destination is computed. In contrast, if it is determined in step 545 that the mobile terminal does not depart from the optimal path, the procedure proceeds to step 560, and then determines if the mobile terminal has reached the destination. If it is determined in step 560 that the mobile terminal has reached the destination, the navigation operation is completed. In contrast, if it is determined in step 560 that the mobile terminal has not reached the destination, the procedure returns to step 535, and the relevant steps are repeated until the mobile terminal reaches the destination.

Figure 6:
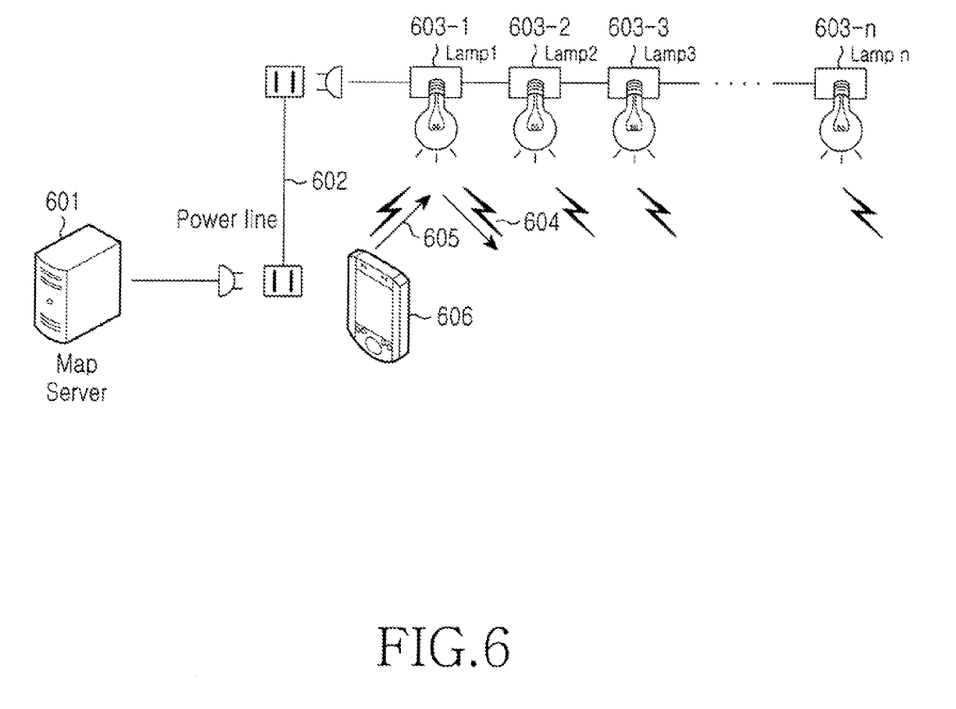
FIG. 6 is a view illustrating a configuration of a navigation system according to an exemplary embodiment of the present invention.

FIG. 6 is a view illustrating a configuration of a navigation system according to an exemplary embodiment of the present invention. As illustrated in FIG. 6, the navigation system according to an exemplary embodiment of the present invention includes a map server 601, a power line 602, a group of lamps 603-1 through 603-n, and a mobile terminal 606.

While only a downlink from the group of lamps 303-1 through 303-n to the mobile terminal 305 exists in the above-described exemplary navigation system, not only is a downlink provided from the group of lamps 603-1 through 603-n to the mobile terminal 606, but also an uplink from the mobile terminal 606 to the group of lamps 603-1 through 603-n exists in the navigation system according to another exemplary embodiment of the present invention. Hence, in the navigation system according to another exemplary embodiment of the present invention, the map server 601 receives a current location and information about a destination, and then computes optimal path information.

In the map server 601, data required to provide the navigation function is stored. As the mobile terminal 606 has a limit on internal storage capacity, if internal information about all buildings is stored in the mobile terminal 606, a problem of storage capacity may arise. Thus, map information on the inside of a building including a plan view of each floor of the building, location information of the respective lamps 603-1 through 603-n, and ID information of the respective lamps 603-1 through 603-n, location information of respective lamp groups, ID information of the respective lamp groups, etc., are stored in the map server 601, which performs communications with the respective lamps 603-1 through 603-n by using PLC. Also, since the uplink from the mobile terminal 606 to the group of lamps 603-1 through 603-*n* exists in the navigation system according to an exemplary embodiment of the present invention, an optimal path up to a destination is computed by the map server 601. On this account, only the optimal path information, minimum map information related to the optimal path, and lamp location information need be transferred to the mobile terminal 606.

The power line 602 is used as a medium for performing the PLC between the map server 601 and the group of lamps 603-1 through 603-*n*, and enables transferring destination information, an ID of the mobile terminal, the lamp IDs, and the lamp group IDs from the group of lamps 603-1 through 603-*n* to the map server 601. Based on the transferred data, the power line 602 carries out the role of delivering the optimal path information computed by the map server 601 to the group of lamps 603-1 through 603-*n*. While the PLC is used in an exemplary embodiment of the present invention, other wire/wireless communication methods, which do not depart from the spirit of the present invention, as well as the PLC, can be applied to the present invention.

The relevant building is equipped with the group of lamps 603-1 through 603-*n*, which are not only used for lighting, but also transmit/receive visible light signals 604 and 605 as VLC devices. In an exemplary embodiment of the present invention, the uplink from the mobile terminal 606 to the group of lamps 603-1 through 603-*n* exists in addition to the downlink. Thus, by using the uplink, the group of lamps 603-1 through 603-*n* receives, from the mobile terminal 606, the visible signal 605 which includes the destination information and the ID information of the mobile terminal, the relevant lamp ID information and the relevant lamp group ID information in the received information. The group of lamps 603-1 through 603-*n* then transfers, to the map server 601, the received information including the relevant lamp ID information and the relevant lamp group ID information. If that happens, the map server computes optimal path information, and then transfers the computed path information to the group of lamps 603-1 through 603-*n* by using the power line 602. Successively, the group of lamps 603-1 through 603-*n* transmits the visible light signal 604, including the optimal path information, to the mobile terminal. Each lamp ID corresponds to location information about the inside of the building and is used to determine a current location of the mobile terminal 606 and a user's final destination. Also, the lamp group corresponds to lamps located in a prescribed zone as one group, and a lamp group ID is assigned to each group in order to identify it.

The mobile terminal 606, corresponding to a portable mobile communication device equipped with a visible light Tx/Rx module, transmits/receives the set of visible light signals to/from the group of lamps 603-1 through 603-*n*. The mobile terminal 606 transmits a visible light signal 605, including destination information and a terminal ID, to the group of lamps 603-1 through 603-*n*, and then receives a relevant visible light signal 604 including optimal path information computed by the map server 601 from the group of lamps 603-1 through 603-*n*. Also, the mobile terminal 606 determines an ID of a relevant lamp of lamps 603-1 through 603-*n* from the received visible light signal to detect a current location of the mobile terminal 606, continues to compare the current location thereof with path information computed by the mobile terminal 606, and then determines if a current progress direction of the mobile terminal 606 is correct.

Figure 7:
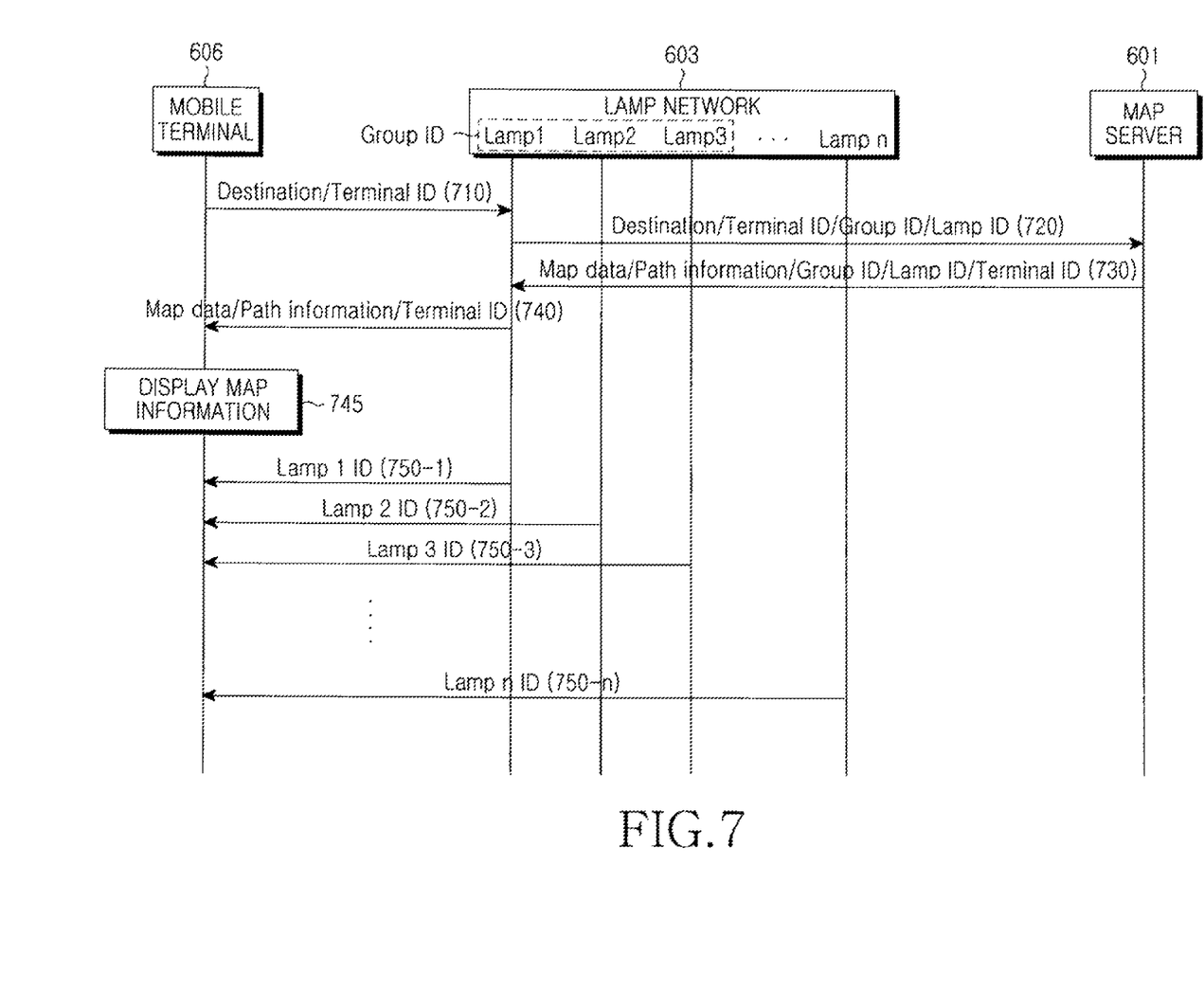
FIG. 7 is a flowchart illustrating a Tx/Rx operation of a navigation system according to an exemplary embodiment of the present invention.

FIG. 7 is a flowchart illustrating a Tx/Rx operation of a navigation system according to an exemplary embodiment of the present invention. Referring to FIG. 7, the navigation system according to an exemplary embodiment of the present invention includes a mobile terminal 606 for performing a navigation operation, a lamp network 603 constructed by lamps located inside of a building, and a map server 601 in which data required to perform the navigation function is stored.

Since the uplink from the mobile terminal 606 to the lamp network 603 exists in the navigation system according to an exemplary embodiment of the present invention, the map server 601 computes optimal path information based on data necessary to perform the navigation operation, and then transfers the computed optimal path information to the mobile terminal 606.

In step 710, the mobile terminal 606 transfers destination information, which is set by a user, and a terminal ID of the relevant mobile terminal 606 to the group of lamps. A terminal ID is used to distinguish the mobile terminal 606. Namely, the terminal ID is transferred so as to be used to distinguish a relevant mobile terminal for the sake of receiving navigation information which is to be received from a subsequently relevant lamp.

In step 720, a relevant lamp which receives information from the mobile terminal 606 in the lamp network 603, transfers the received destination information, the received terminal ID information, a relevant lamp ID, and a relevant lamp group ID to map server 601. Among them, the destination information and the terminal ID information correspond to information that has been received from the mobile terminal 606, and the relevant lamp ID corresponds to an ID of the relevant lamp which has received the destination information and the terminal ID from the mobile terminal 606. The relevant lamp group ID corresponds to an ID of a relevant lamp group to which the relevant lamp belongs. A lamp group ID is transmitted because a problem may arise in receiving responding path information with the lamp ID alone in a case where a mobile terminal 606 does not stay in its current position but moves after it transmits information.

Figure 9:
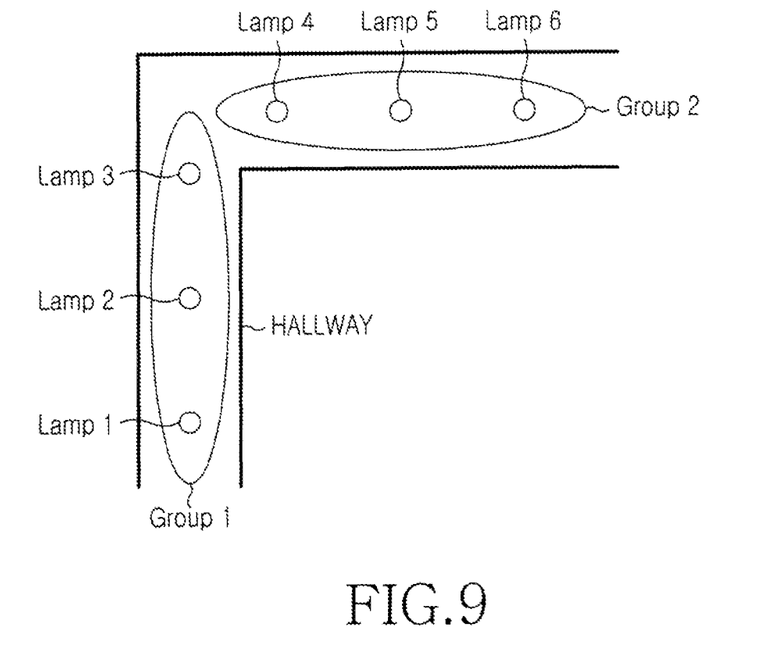
FIG. 9 is a view illustrating an installation form of each lamp group in a navigation system according to an exemplary embodiment of the present invention.

FIG. 9 is a view illustrating an installation form of each lamp group in a navigation system according to an exemplary embodiment of the present invention. As depicted in FIG. 9, among a plurality of lamps, the lamps located in a predetermined zone are classified as a unique group. Accordingly, by transferring a group ID, response information may be transmitted to all lamps classified as one group in a surrounding zone of a particular lamp, and then the mobile terminal can receive path information while it is moving to the surrounding zone.

Figure 10:
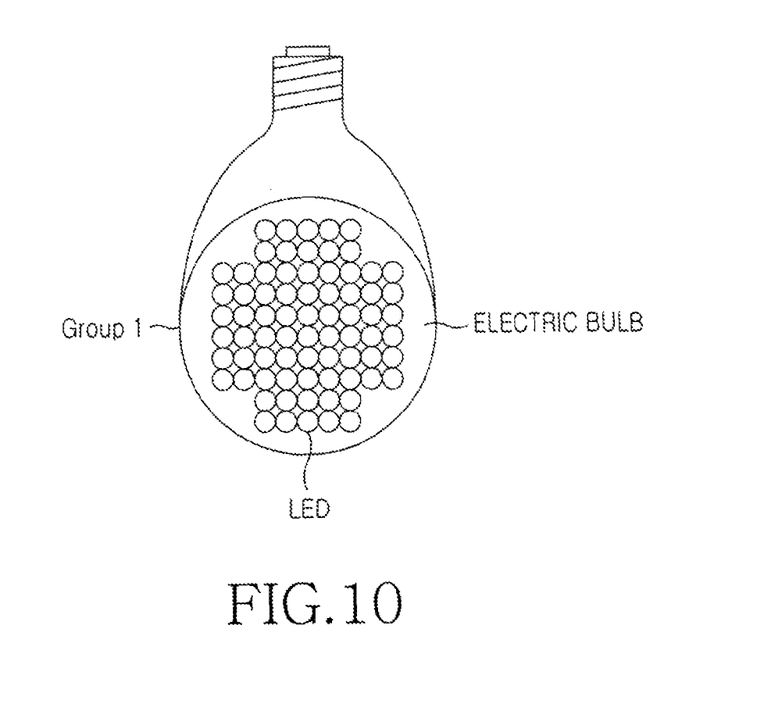
FIG. 10 is a view illustrating a configuration of LEDs in a navigation system according to an exemplary embodiment of the present invention.

FIG. 10 is a view illustrating a configuration of LEDs in a navigation system according to an exemplary embodiment of the present invention. Also, as shown in FIG. 10, since a lamp corresponds to a combination of a plurality of LEDs, by setting LEDs located in a prescribed zone among LEDs belonging to each lamp as one group, each lamp group can be formed. Hence, in step 710, if response information is transmitted to a lamp group to which the relevant lamp of the lamps 603-1 through 603-*n* that receives information from the mobile terminal 606 belongs, information can be stably transmitted to the mobile terminal 606.

Based on stored map data, the received destination information, the received lamp group ID, the received lamp ID and the received terminal ID, the map server 601 detects a current location of the mobile terminal 606, and then computes an optimal path to a destination. Since the uplink from the mobile terminal 606 to the lamp network 603 exists in an exemplary embodiment of the present invention, the mobile terminal 606 does not compute optimal path information, but the map server 601 computes the optimal path information by using a path search algorithm. In an exemplary embodiment of the present invention, power consumption and memory size of the mobile terminal 606 can be reduced due to the above feature.

Referring again to FIG. 7, in step 730, the map server 601 transfers, to the lamp network 603, map data including location information of lamps, optimal path information, a terminal ID, a lamp ID, and a lamp group ID. The above map data corresponds to a map (i.e., a plan view) required to perform the navigation function from a current location of the mobile terminal 606 up to a destination, and includes information on locations and IDs of lamps.

The optimal path information includes ID information of lamps located on a path from a current location to the final destination. The lamp ID and the lamp group ID respectively represent an ID of a lamp and an ID of a lamp group including the lamp, which transmit a visible light signal to a relevant mobile terminal 606. The terminal ID corresponds to ID information of a relevant mobile terminal 606 that performs the navigation function. The mobile terminal 606 distinguishes its own data from the others through the terminal ID.

In step 740, the lamp network 603 that has received information from the map server 601 refers to a lamp group ID and a lamp ID included in the received information, and then, a relevant lamp group transmits a visible signal, including map data, optimal path information, and a terminal ID.

In step 745, the mobile terminal 606 displays map information about a floor where the mobile terminal 606 is currently located, and optimal path information up to a destination by using map information and optimal path information received from the relevant lamp group.

In steps 750-1 to 750-n, if the user begins to move with reference to a display of the mobile terminal 606, the mobile terminal 606 compares a current location of the mobile terminal 606 with the optimal path information, and then determines if the user proceeds in a correct direction. Namely, the mobile terminal 606 detects ID information of a relevant lamp from the visible light signal received from the relevant lamp illuminating a zone where the mobile terminal 606 is currently located, and then detects a current location of the mobile terminal 606. Successively, the mobile terminal 606 compares the current location with the optimal path information, and then determines if the mobile terminal 606 itself proceeds in a correct direction. If it is determined that the mobile terminal 606 departs from the optimal path, the user is informed of information on a direction in which the mobile terminal 606 may return to the optimal path, or a path is reset by transferring a current location of the mobile terminal 606 itself to a server, depending on the extent to which the mobile terminal 606 departs from the optimal path.

Figure 8:
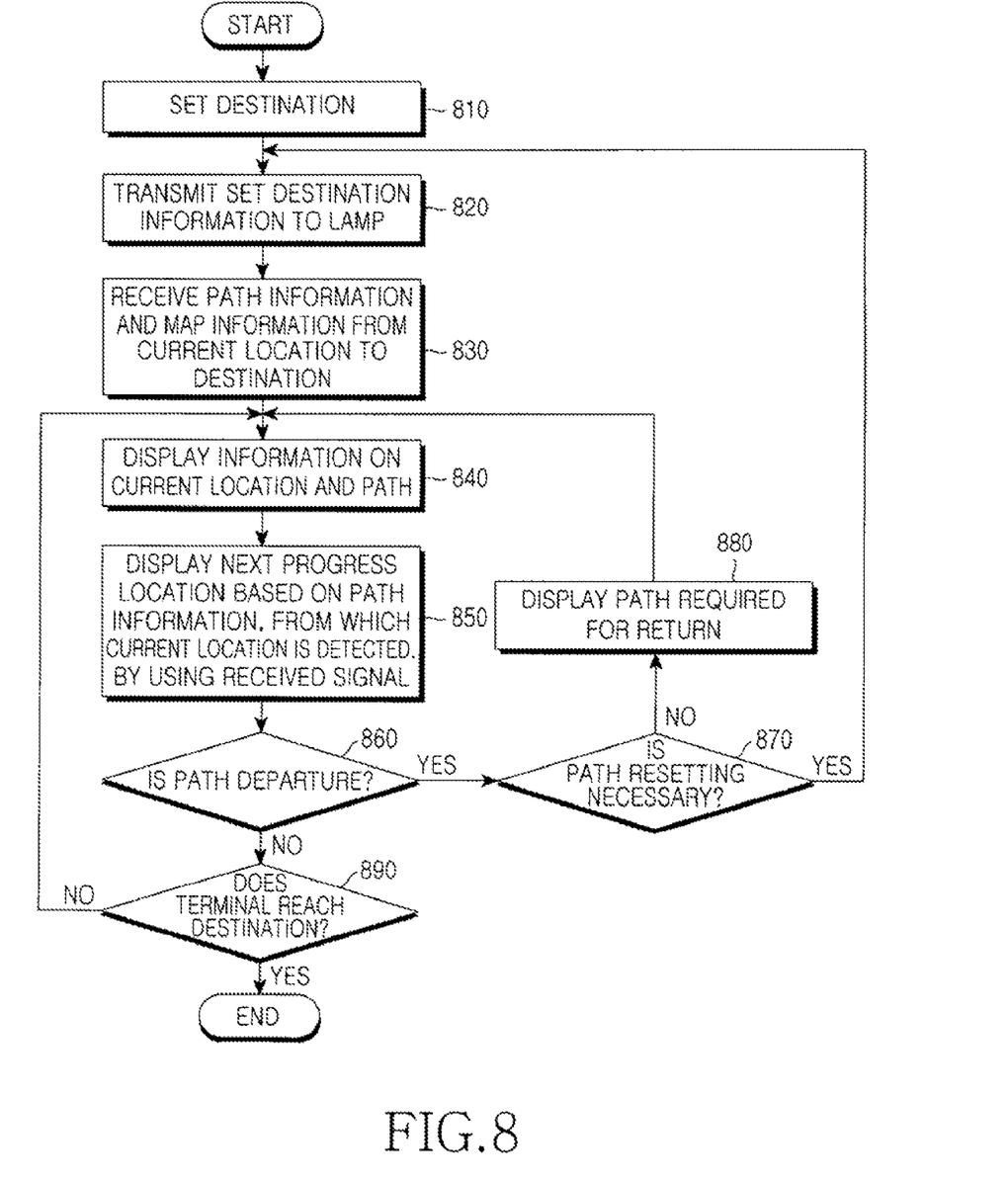
FIG. 8 is a flowchart illustrating an operation of a terminal in a navigation system according to an exemplary embodiment of the present invention.

FIG. 8 is a flowchart illustrating an operation of a mobile terminal in a navigation system according to an exemplary embodiment of the present invention. In step 810, a destination is set through the mobile terminal. The destination setting can be performed by a user input.

In step 820, the mobile terminal transmits, to a relevant lamp, the destination information which has been set by using the uplink. In step 830, the mobile terminal receives optimal path information and map information from a current location to a destination, corresponding to the information which has been transmitted to the relevant lamp in step 820.

Then, in step 840, the mobile terminal displays a path image by using the information received in step 830. The path image includes map information, current location information, and optimal path information.

In step 850, the mobile terminal detects a current location of the mobile terminal through information on an ID and a location of a relevant lamp from the received visible light signal, and then displays the next progress location based on the optimal path information received in step 830.

In step 860, a determination of a path departure of the mobile terminal is made. The determination is made by comparing the current location of the mobile terminal detected in step 850 with the optimal path received in step 830, and if the current location is not part of the optimal path, a determination of a path departure is made about the mobile terminal. If the determination of a path departure is correct in step 860, the procedure proceeds to step 870 and determines if path resetting is necessary. Based on the path resetting determination, if the mobile terminal departs from the original optimal path by a short distance, a path is not reset, but a display is made so that the mobile terminal may return to the original path. In contrast, if the mobile terminal departs from the original optimal path by a long distance, an optimal path is computed, and then a determination is made so that a path can be reset. The reference of the path resetting determination is established based on a distance difference between the original optimal path and a departed current location, and can be adequately established in either one of a street unit, a block unit, a floor unit, and other metric depending on the size or the structure of a relevant building. If it is determined in step 870 that path resetting is not necessary, the procedure proceeds to step 880, in which a path along which the mobile terminal returns the original path is displayed, and then returns to step 840. If it is determined in step 870 that path resetting is necessary, the procedure returns to step 820, and then an optimal path from a new current location to the destination is received again. If it is determined in step 860 that the mobile terminal does not depart from the optimal path, the procedure proceeds to step 890, and then determines if the mobile terminal has reached the destination. If it is determined in step 890 that the mobile terminal has reached the destination, the navigation operation is completed. In contrast, if it is determined in step 890 that the mobile terminal has not reached the destination, the procedure returns to step 840, and then the relevant steps are repeated until the mobile terminal reaches the destination.

In another exemplary embodiment of the present invention, destination information is transmitted from the mobile terminal to the map server, and then optimal path information corresponding to the transmitted destination information is received, thereby the navigation operation is performed. In addition, a navigation system can be configured in such a scheme as follows. Before destination information is set through the mobile terminal, a mere operation for selecting a navigation menu enables receiving map information, location information of a relevant lamp and ID information of the relevant lamp from the map server, and then enables displaying current location information of the mobile terminal, thereby enabling a user to easily recognize his/her own location.

Figure 11:
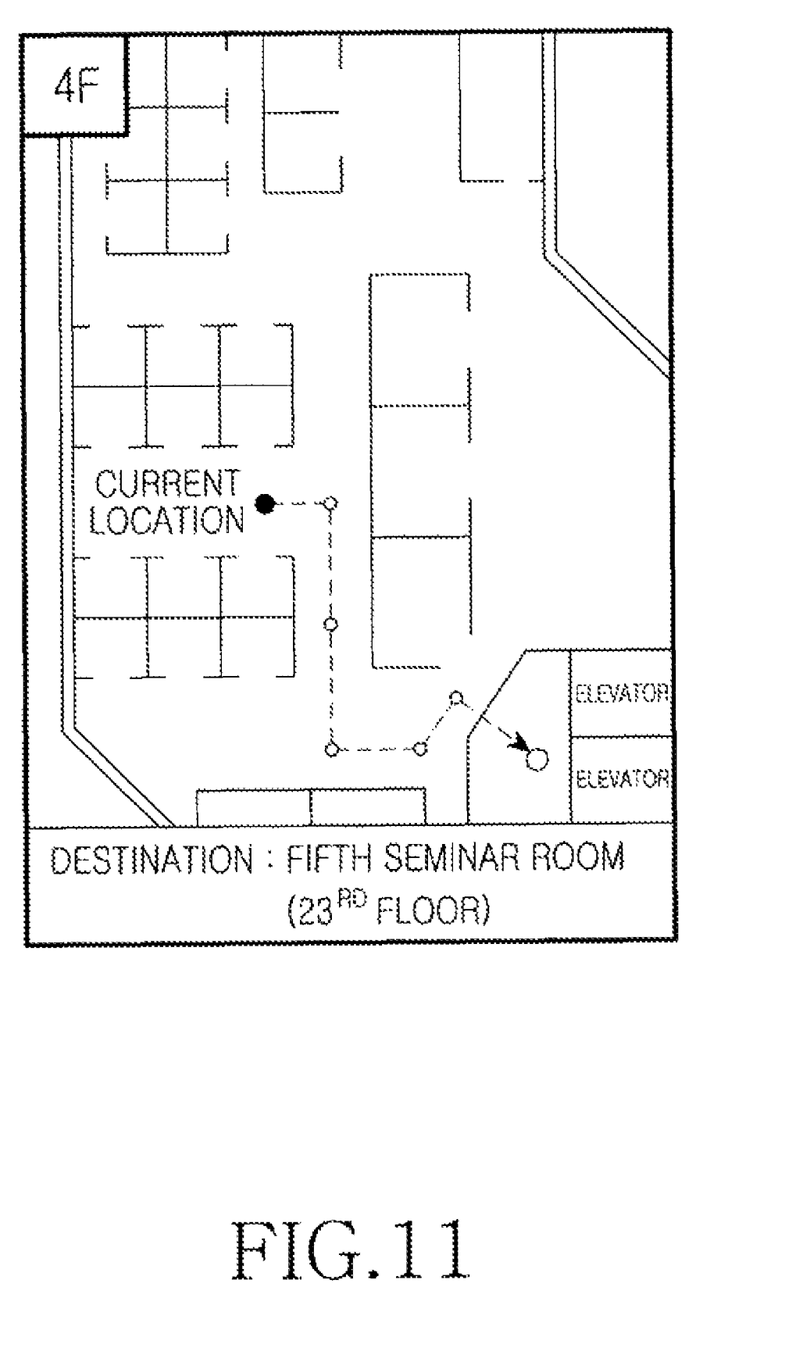
FIG. 11 is a view illustrating a display of a terminal during an operation of a navigation system according to an exemplary embodiment of the present invention.

FIG. 11 is a view illustrating a display of a terminal during an operation of a navigation system according to an exemplary embodiment of the present invention. As depicted in FIG. 11, a current location of a relevant user and path information up to a relevant destination in a plan view of a floor where the relevant user is currently located, are included in the display screen. Additionally, the navigation system can be configured in such a manner that added convenience functions, including the enlargement and reduction of a map, direction display, the time required up to a destination which considers a pedestrian's movement velocity, and the like may be displayed on the display screen.

As described above, a configuration and an operation of a system and a method for navigation using VLC according to an exemplary embodiment of the present invention can be implemented.

In the present invention, a navigation function can be provided by using VLC inside of a building where a GPS signal cannot be received. Accordingly, the navigation function capable of easily finding a destination in a skyscraper and a large building can be utilized.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal for a navigation system using Visible Light Communications (VLC), the mobile terminal comprising:
    a VLC module for receiving a visible light signal; and
    a controller for performing the VLC with at least one of a plurality of lamps illuminating a zone where the mobile terminal is located through the VLC module provided to the mobile terminal, for comparing an IDentification (ID) and location information of the at least one lamp with map information upon receiving the visible light signal from the at least one lamp and for determining a current location of the mobile terminal,
    wherein the map information comprises location information of each lamp, ID information of each lamp, and ID information of each lamp group corresponding to lamps located in a prescribed zone as one group.

2. The mobile terminal as claimed in claim 1, wherein the plurality of lamps, each lamp having a respective identifiable and unique ID, for performing Power Line Communications (PLC) with a map server, wherein each of the plurality of lamps is equipped with the VLC module, wherein the map server in which map information is stored.

3. The mobile terminal as claimed in claim 2, wherein the map information comprises map information on the inside of a building including at least one of a plan view of each floor, location information of each lamp, ID information of each lamp, ID information of each lamp group, and location information of each lamp group.

4. The mobile terminal as claimed in claim 2, wherein the VLC module of the mobile terminal comprises a visible light transmit/receive (Tx/Rx) module for transmitting a visible light signal including destination information to the at least one lamp illuminating the zone where the mobile terminal is located and for receiving a visible light signal including optimal path information from the at least one lamp illuminating the zone where the mobile terminal is located.

5. The mobile terminal as claimed in claim 4, wherein the at least one lamp which receives the visible light signal including the destination information from the mobile terminal transfers path request information including the destination information to the map server, receives the optimal path information corresponding to a response to the path request information from the map server, and generates the visible light signal including the received optimal path information.

6. The mobile terminal as claimed in claim 5, wherein, if the map server receives the path request information from the at least one lamp, the map server computes optimal path information equivalent to the path request information, and then transfers the computed optimal path information to the at least one lamp.

7. The mobile terminal as claimed in claim 2, wherein, the VLC module of the mobile terminal comprises a visible light Rx module, and further wherein the map server transfers the map information to each lamp.

8. The navigation mobile terminal as claimed in claim 7, wherein the at least one lamp receives the map information from the map server, and generates a visible light signal in response to the received map information.

9. The mobile terminal as claimed in claim 8, wherein the mobile terminal receives the map information from the at least one lamp illuminating the zone where the mobile terminal is located, and displays a map image responding to the provided map information.

10. The mobile terminal as claimed in claim 9, wherein the mobile terminal computes an optimal path to a destination, and displays a path image including the computed optimal path information.

11. The mobile terminal as claimed in claim 1, wherein the mobile terminal displays a current location image including current location information of the mobile terminal.

12. A navigation method of a mobile terminal for a navigation system using Visible Light Communications (VLC), the navigation method comprising the steps of:
    (a) receiving a visible light signal from a lamp illuminating a zone where a mobile terminal is located, comparing, with map information, an IDentification (ID) and location information of the lamp illuminating the zone where the mobile terminal is located, and determining a current location of the mobile terminal;
    (b) transmitting, by the mobile terminal, a visible light signal including at least one of input destination information, terminal ID information, and the determined current location information to a lamp while inputting the destination information through the mobile terminal;
    (c) receiving a response information including optimal path information and the map information as a visible light signal, by the mobile terminal; and
    (d) displaying, by the mobile terminal, a path image including optimal path information,
    wherein the map information comprises location information of each lamp, ID information of each lamp, and ID information of each lamp group corresponding to lamps located in a prescribed zone as one group.

13. The navigation method as claimed in claim 12, wherein the path request information comprises at least one of destination information, terminal ID information, lamp ID information, and lamp group ID information.

14. The navigation method as claimed in claim 12, wherein the response information comprises at least one of the computed optimal path information, map information including lamp location information, a terminal ID, a lamp ID, and a lamp group ID.

15. The navigation method as claimed in claim 12, wherein the generated visible light signal is transmitted by a lamp belonging to a relevant lamp group, based on making a determination of a lamp group ID included in the response information.

16. The navigation method as claimed in claim 12, wherein the path image comprises at least one of map information on a layer where the mobile terminal is currently located, current location information of the mobile terminal, and the optimal path information.

17. The navigation method as claimed in claim 12, further comprising the steps of:
- (e) comparing a current location of the mobile terminal with the optimal path information, and displaying a next movement location thereof on the optimal path information; and
- (f) determining if path resetting is necessary if the mobile terminal goes out of an optimal path.

18. The navigation method as claimed in claim 17, wherein, if it is determined in step (f) that the path resetting is necessary, optimal path information is reset by performing steps (a) to (d), and then a navigation operation is performed.

19. The navigation method as claimed in claim 17, wherein, if it is determined in step (f) that the path resetting is not necessary, a path along which the mobile terminal returns from a current location thereof to a location on an existing optimal path is displayed.

20. A navigation method using Visible Light Communications (VLC), the navigation method comprising the steps of:
- (a) receiving, by a mobile terminal, a visible light signal including map information from a lamp illuminating a zone where the mobile terminal is located; and
- (b) comparing, with the map information, an IDentification (ID) and location information of the lamp illuminating the zone where the mobile terminal is located upon receiving the visible light signal and determining a current location of the terminal, and displaying a map image including the determined current location information, by the mobile terminal,
- wherein the map information comprises location information of each lamp, ID information of each lamp, and ID information of each lamp group corresponding to lamps located in a prescribed zone as one group.

21. The navigation method as claimed in claim 20, further comprising a step of (c), when a destination information be input, computing an optimal path from a current location of the mobile terminal to a destination, and displaying a path image including the computed optimal path information, by the mobile terminal.

22. The navigation method as claimed in claim 21, wherein the path image comprises at least one of map information on a layer where the mobile terminal is currently located, current location information of the mobile terminal, and the optimal path information up to the destination.

23. The navigation method as claimed in claim 20, wherein the map information required to provide the navigation function comprises at least one of map information on the inside of the building including a plane view of each floor, a location of each lamp, and an ID of each lamp.

24. The navigation method as claimed in claim 21, further comprising the steps of:
- (d) comparing a current location of the mobile terminal with the optimal path information, and displaying a next movement location thereof on the optimal path information; and
- (e) determining if path resetting is necessary if the mobile terminal goes out of the optimal path.

25. The navigation method as claimed in claim 24, wherein, if it is determined in step (e) that the path resetting is necessary, optimal path information is computed again by performing step (c) the computing of the optimal path, and then a navigation operation is performed.

26. The navigation method as claimed in claim 24, wherein, if it is determined in step (e) that the path resetting is not necessary, a path along which the mobile terminal returns from a current location thereof to a location on an existing optimal path is displayed.

* * * * *